United States Patent [19]

Shigaki et al.

[11] 3,716,339
[45] Feb. 13, 1973

[54] HYDROGEN CHLORIDE RECOVERY INCINERATOR FOR PLASTICS CONTAINING HYDROGEN AND CHLORINE

[75] Inventors: Masanobu Shigaki, Toyonaka-shi, Osaka; Shigehiro Kido, Itami-shi; Yoshikazu Chiba, Yao-shi, Osaka, all of Japan

[73] Assignee: Takuma Kikan Mfg., Co., Osaka, Japan

[22] Filed: Dec. 14, 1970

[21] Appl. No.: 97,785

[52] U.S. Cl. ...............23/262, 23/277 C, 423/488, 110/8 R, 110/15, 110/14, 201/25, 260/96 d
[51] Int. Cl. .........................F23g 7/00, C01b 7/08
[58] Field of Search ............23/262, 277 C, 154, 263; 260/96 R, 96 D, 92.8 A; 110/8 R, 15, 14; 201/25

[56] References Cited

UNITED STATES PATENTS

| | | | |
|---|---|---|---|
| 2,213,667 | 9/1940 | Dundas et al. | 261/76 X |
| 3,403,643 | 10/1968 | Denig | 110/15 X |
| 3,495,555 | 2/1970 | Boyd et al. | 110/8 R |
| 3,098,458 | 7/1963 | Lantz, Jr. | 110/14 |

OTHER PUBLICATIONS

S. L. Madorsky, Thermal Degradating Organic Polymers; pp. 665–671; SPE. Journal July 1961; Nat. Bureau of Stds. Polymer Science.

*Primary Examiner*—James H. Tayman, Jr.
*Attorney*—William C. Babcock

[57] ABSTRACT

An apparatus for the disposal of scrap vinyl polymers containing chlorine and hydrogen. The apparatus includes a rotary kiln that is adapted to receive said scrap plastic and heat the same to a temperature at which the plastic partially decomposes, and the major portion of the chlorine escaping therefrom as hydrogen chloride gas, which gas together with any chlorine which results from the decomposition is recovered in a confined space for subsequent usage.

The partially decomposed scrap plastic is sequentially removed from the rotary kiln in a dried state and crushed. The crushed plastic is discharged by a blower onto a grate in a furnace where the scrap plastic is burned. The hot gases of combustion from the burning together with fines and dust arising from the burning operation are conducted through a passage to heat air that is subsequently used in the heating of the rotary kiln. The hot gases of combustion, together with entrained solid materials, are discharged into a dust collector to remove the fines and dust therefrom. The gases after being freed of solid materials are subsequently discharged through a chimney to the ambient atmosphere. The gases discharged to the ambient atmosphere are substantially free of chlorine and hydrogen chloride gases.

4 Claims, 1 Drawing Figure

PATENTED FEB 13 1973
3,716,339
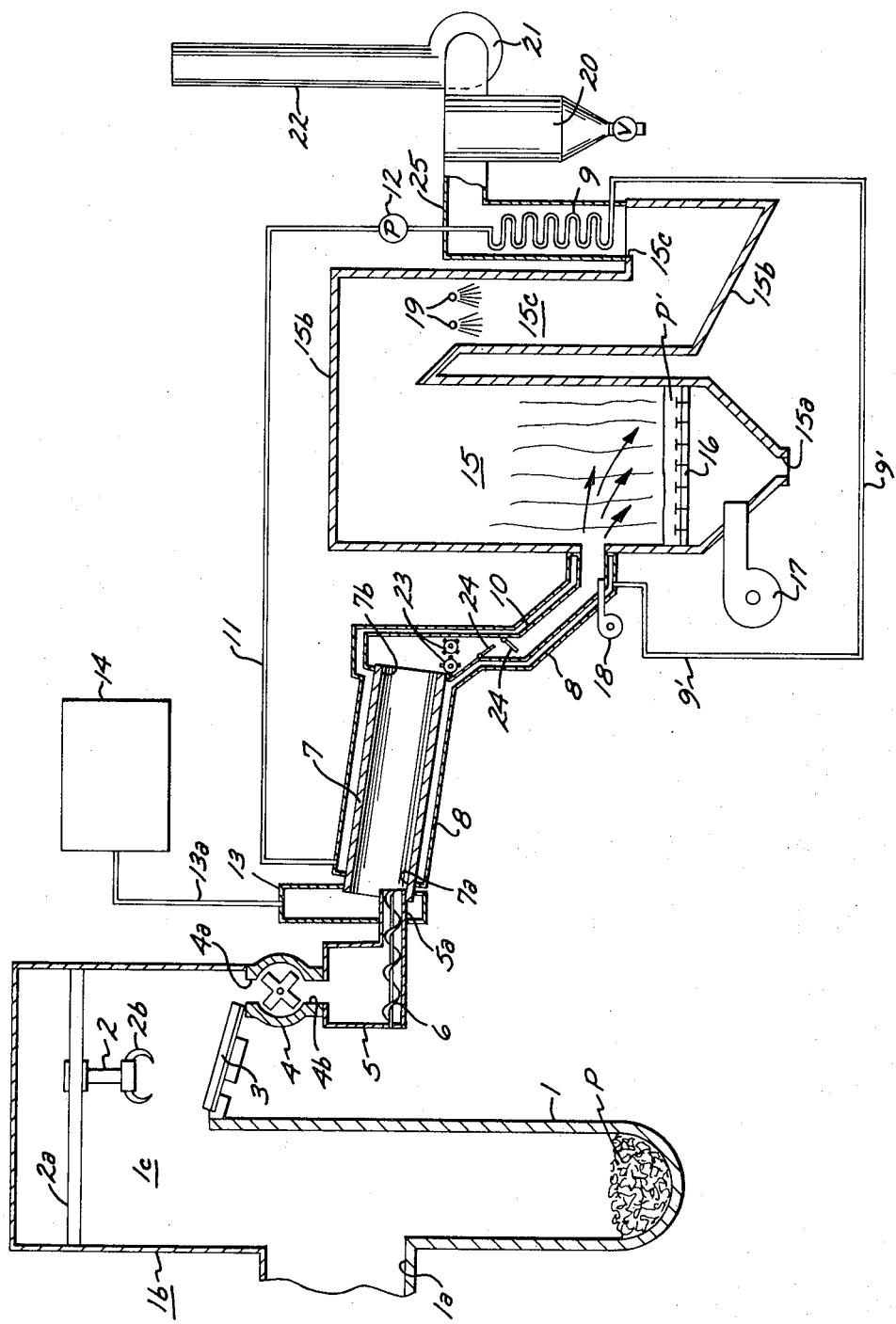
INVENTORS.
MASANOBU SHIGAKI
SHIGEHIRO KIDO
BY YOSHIKAZU CHIBA
William G. Babcock
ATTORNEY

HYDROGEN CHLORIDE RECOVERY INCINERATOR FOR PLASTICS CONTAINING HYDROGEN AND CHLORINE

CROSS-REFERENCES TO RELATED APPLICATIONS

Japanese Patent Application, Ser. No. 44/79406, filed Oct. 3, 1969 in the name of Takuma Kaikan Manufacturing Company.

BACKGROUND OF THE INVENTION

1. Field of the Invention

A plastic waste incinerating method and apparatus therefor.

2. Description of the Prior Art

Vast quantities of vinyl polymer chlorides in the form of scrap must be disposed of under present day conditions due to the wide usage of such material for containers and the like. The disposal of such vinyl polymers has presented a serious problem, in that, when they are incinerated obnoxious gases and fly ash are evolved. Furthermore, this incineration can be performed only with the aid of heavy oil or fuel gas that is mixed with the scrap material to obtain a sufficiently high temperature at which the scrap will burn.

The primary purpose in devising the present invention is to provide an incinerator apparatus in which scrap vinyl polymer chlorides, such as polyvinyl chloride and polyvinylidene chloride, are partially decomposed by heat to free the same of chlorine. The major portion of the chlorine escapes therefrom in the form of hydrogen chloride gas, with the partially decomposed scrap thereafter being burned in an excess of air within a confined space. Fines entrained in the gases of combustion are subsequently separated therefrom, with the gases of combustion thereafter being discharged to the ambient atmosphere. The gases of combustion are not obnoxious, as full and complete burning of the partially polymerized plastic is attained, and the gases of combustion are primarily carbon dioxide.

SUMMARY OF THE INVENTION

An apparatus for the disposal of scrap vinyl polymers containing hydrogen and chlorine. The scrap polymers are sequentially fed into a rotating kiln that is maintained at a sufficiently high temperature as to cause the partial decomposition of the scrap, with the chlorine separating from the scrap in the form of gases that are recovered in a suitable confined space and hence do not contaminate the atmosphere. The scrap polymer after being partially decomposed is a solid that is subsequently crushed. The crushed partially decomposed polymer is sequentially discharged onto the grate of a furnace, which grate is subjected to a current of air that is substantially in excess to that required for complete combustion of the scrap material. Fines and fly ash arising from the combustion, together with the gases of combustion in which they are entrained are directed through a passage where the hot gases contact a heat exchanger. Air under pressure is circulated through the heat exchanger and is then conducted to the rotary kiln to heat the latter. After the hot gases of combustion and particles of solid materials entrained therewith have been discharged past the heat exchanger, they are subjected to a dust collector to remove the fines and fly ash, with the gases of combustion subsequently being discharged to the ambient atmosphere through a chimney.

A major object of the present invention is to supply an apparatus, in which chlorine and hydrogen is caused to separate from vinyl polymers containing the same as hydrogen chloride by the action of heat at a first temperature, and the scrap polymer, after such separation being burned at a second temperature higher than said first temperature without fly ash and fine particles from the scrap being discharged to the ambient atmosphere.

Another object of the invention is to supply an apparatus for large scale disposal of scrap vinyl polymers containing chlorine without generating gases that are obnoxious when discharged to the ambient atmosphere, and the chlorine being recovered from the disposal operation either in the form of a gas, or as hydrogen chloride gas, which may be subsequently used for industrial purposes.

A still further object of the invention is to supply an apparatus for the disposal of scrap vinyl polymers containing chlorine in which the burning of the polymer after being partially decomposed generates sufficient heat to cause said partial decomposition.

Yet another object of the invention is to supply an incinerator device particularly adapted for use in the disposal of vinyl polymer chlorides and the apparatus of such character as to be economical in operation, as well as to permit the large scale disposal of such scrap polymers with a minimum of personnel.

BRIEF DESCRIPTION OF THE DRAWING

The FIGURE is a schematic view of the apparatus used in the disposal of scrap vinyl polymers containing chlorine.

DESCRIPTION OF THE PREFERRED EMBODIMENT

The vinyl polymers containing a chlorine that are now widely used, and provide scrap that must be disposed of, are polyvinyl chloride and polyvinylidine chloride. The polyvinyl chloride polymer contains chlorine in an amount of 56.8 percent of the weight thereof, while the polyvinylidine chloride polymer includes chlorine in the amount of 72.8 percent of the weight thereof. When such scrap plastic is attempted to be disposed of by conventional burning, the large amount of chlorine gas discharged in the combustion thereof prevents the complete burning of the scrap material in a furnace.

Due to this discharge of chlorine within a furnace, even when a surplus of air is supplied for the burning operation, the temperature of the furnace remains relatively low, and can only be increased to the extent that substantial combustion of the plastic takes place by adding heavy oil or combustible fuel gas thereto. The above described operation is objectionable due to the requirement that heavy oil and combustible fuel gas must be supplied to support the burning of the plastic, which obviously is not economical, and in addition large quantities of chlorine and hydrogen chloride gas are evolved which are a public nuisance when discharged to the ambient atmosphere. Neutralization of such gases requires expensive equipment, and an operation which from experience has been found to be difficult to carry out.

It has been found by experience that when vinyl polymer chlorides, such as polyvinyl chloride, are heated in the range of 200°C. to 280°C. that the scrap plastic discharges hydrogen chloride gas therefrom. The major portion of the chlorine that formed a part of the scrap plastic is separated therefrom as hydrogen chloride gas, and the partially decomposed plastic that remains will burn completely in an atmosphere that contains an excess of air. Heating of polyvinyl chloride and polyvinylidine chloride to a temperature in excess of 280° is undesirable, as the polymers will undergo further decomposition in which undesirable products such as benzene, ethylene and the like are emitted.

By reference to the drawing it will be seen that the present invention includes a vertically extending storage pit 1 into which scrap plastic P may be dumped by gravity through an opening 1a. A wall structure 1b extends upwardly from the pit 1 and defines a confined space 1c. The wall structure 1b supports a traveling crane 2 that is movably supported on a horizontal rail 2a that has the ends thereof secured to the wall structure 1b.

The traveling crane 2 includes vertically movable buckets or claws 2b that may be raised and lowered by power means (not shown) to sequentially grasp portions of the scrap P, and raise the same to a position where the scrap P can be dropped onto a horizontal power driven inclined vibrating feeder 3 that is of conventional design. A power driven crusher assembly 4 is shown in the drawing that is of conventional design, and has an opening 4a in the upper portion thereof that sequentially has scrap plastic P discharged therethrough from the vibrating feeder 3. The crusher 4 has a discharge opening 4b in the lower portion thereof through which crushed scrap plastic P is discharged into an enclosed bunker 5.

The bunker 5 has a power driven screw conveyor 6 situated in the lower portion thereof, which screw conveyor when operating discharges plastic P from the bunker 5 through a conduit 5a into a first end 7a of a horizontal inclined power driven rotary kiln 7. The kiln 7 as may be seen in the drawing has a second end 7b that is of lower elevation that the first end 7a. The rotary kiln 7 has a jacket 8 extending therearound and outwardly spaced therefrom. The jacket 8 extends not only around the kiln 7, but also around a downwardly extending chute 10 that is in communication with the second end 7b of the kiln 7. An air heater 9 is provided as may be seen in the drawing which is in the form of a heat exchanger, and has a conduit 9' extending from a first end thereof to the lower portion of the jacket 8 as shown in the drawing. A second conduit 11 extends from the upper portion of the jacket 8 as may be seen in the drawing to the suction side of a power driven blower or fan 12, which blower is connected to the air heater 9. When the blower 12 is actuated, air is continuously circulated through the conduit 9', jacket 8 and conduit 11 to transfer heat from the air heater 9 to heat the chute 10 and kiln 7.

The plastic material P discharged into the kiln 7 is heated to not over 280°C. whereby the scrap plastic P in the kiln partially decomposes, with the chlorine escaping therefrom in the form of hydrogen chloride gas. The gas escaping from the plastic material P in the kiln 7 flows into a collecting chamber 13 that has a conduit 13a extending therefrom to an enclosed structure 14. The hydrogen chloride gas discharging into structure 14 is easily recovered due to its ready solubility in water and may subsequently be used for industrial purposes, such as in the manufacture of chemicals, fertilizers and the like. The plastic material P after being partially decomposed in the kiln 7 solidified, and is reduced in size prior to passage into the chute 10 by power driven crushers 23 as may be seen in the drawing. Flow of the crushed plastic through the chute 10 is by gravity, and the flow of the crushed plastic being controlled by pivotally movable baffles or other flow controlling means 24 as shown in the drawing.

A furnace 15 is provided as may be seen in the drawing, which is vertically disposed, and has an apertured grate 16 located within the lower confines thereof. A power driven blower 17 discharges a current of air into the confines of the furnace 15, with the current of air flowing upwardly through the grate 16 and the partially decomposed scrap plastic P' that rests on the grate. The plastic P' is discharged onto the grate by use of a second power driven blower 18 shown in the drawing that discharges a current of air into the lower portion of the chute 10 and as a result directs the crushed scrap plastic P' onto the grate to cover the latter. The furnace 15 has an opening 15a in the lower portion thereof through which particles of solid material that do not burn on the grate 16 may drop downwardly therethrough by the action of gravity.

The furnace 15 is defined by a wall structure 15b that provides a downwardly extending passage 15c that has at least one water spray unit 19 mounted therein. The water spray units 19 are used to control the temperature of the gases of combustion from the furnace 15, prior to these gases contacting the air heater 9. The walls 15b of the furnace 15 have an opening 15c therein that is in communication with an upwardly extending inverted L-shaped conduit 25 that has the heater 9 situated within the confines thereof.

The hot gases of combustion from the furnace 15 as they pass through the conduit 25 contact the heat exchanger or air heater 9 and heat the air that is circulated therethrough by action of the blower 12. The hot gases of combustion and solid materials entrained therewith such as fly ash and the like discharge therefrom into a dust collector 20 of conventional design as shown in the drawing, which dust collector is connected to a power driven ventilator unit 21. The ventilator unit 21 draws the gases of combustion through the conduit 25 and dust collector 20 and discharges these gases free of fly ash and particles of solid material up a chimney 22 for discharge to the ambient atmosphere. The gases of combustion so discharged to the ambient atmosphere are substantially free of chlorine and hydrogen chloride gases and hence are not obnoxious or detrimental to the area surrounding the apparatus that forms the subject matter of this application. The method of using the apparatus is apparent from the previous descriptive material and need not be repeated.

We claim:

1. An incinerator device for recovering hydrogen chloride from scrap plastic prior to the latter being burned, said plastic of a type that contains hydrogen and chlorine and that partially decomposes to yield substantially hydrogen chloride only when heated to a first temperature, said incinerator device including:
 a. an angularly disposed rotary, power driven kiln having first and second open ends, said first end higher than said second end, and said kiln capable of having said scrap plastic heated therein to said first temperature;
 b. a hydrogen chloride collecting chamber in communication with said first end;
 c. a hydrogen chloride collector in communication with said chamber;
 d. first means for sequentially discharging said scrap plastic at a desired rate into said first end of said kiln for said scrap plastic to be partially decomposed when heated to said first temperature;
 e. second power operated means for crushing said partially decomposed plastic as the latter discharges by gravity from said second end of said kiln;
 f. a downwardly extending chute through which crushed partially decomposed plastic is received from said second power-operated means;
 g. a furnace that includes a grate onto which said crushed partially decomposed plastic is discharged from said chute;
 h. third means for supplying a surplus of air to the interior of said furnace as said partially decomposed plastic burns to gaseous products of combustion on said grate;
 i. a jacket extending around said kiln to receive a heated fluid at a temperature sufficient to heat the interior of said kiln to said first temperature, said jacket and collecting chamber obstructing communication between said first and second ends of said kiln and the ambient atmosphere;
 j. a heat exchanger that is heated by said gaseous products of combustion to a second temperature higher than said first temperature, said heat exchanger having a first end through which fluid can enter to be heated, and a second end through which heated fluid can discharge;
 k. a power driven pump having an inlet and a discharge;
 l. first conduit means connecting said discharge to said first end of said heat exchanger;
 m. second conduit means connecting said second end of said heat exchanger to the interior of said jacket for said heated fluid from said heat exchanger to heat said kiln to said first temperature;
 n. third conduit means connecting said inlet of said pump to the interior of said jacket to permit a continuous circulation of said heated fluid to said jacket;
 o. a chimney in communication with the interior of said furnace only to receive said gaseous products of combustion and discharge the same to the ambient atmosphere after said gaseous products of combustion have heated said heat exchanger; and
 p. fourth means for controlling the temperature of said heat exchanger to one at which said fluid is heated to the extent that said kiln is maintained at said first temperature at which substantially hydrogen chloride only is obtained from the partial decomposition of said plastic in said kiln.

2. An incinerator device as defined in claim 1 in which said first means comprises:
 q. a storage pit structure in which said scrap plastic is deposited;
 r. a power driven vibrating feeder;
 s. power means for moving said scrap plastic from said storage pit onto said vibrating feeder;
 t. a power driven crusher that receives said scrap plastic from said vibrating feeder and reduces said scrap in size;
 u. a bunker that receives said scrap plastic that has been reduced in size; and
 v. a power driven conveyor that moves said scrap plastic that has been reduced in size from said bunker to said first end of said kiln.

3. An incinerator device as defined in claim 1 which in addition includes:
 q. dust collecting means interposed between said furnace and chimney for removing particles of solids from said gaseous products of combustion prior to the latter being discharged to the ambient atmosphere.

4. An incinerator device as defined in claim 1 in which said fourth means is a device for forming a water spray that may be discharged into said gaseous products of combustion to cool the same to a desired degree prior to said gaseous products of combustion contacting said heat exchanger.

* * * * *